United States Patent [19]
Herbreteau et al.

[11] Patent Number: 5,657,508
[45] Date of Patent: Aug. 19, 1997

[54] APPARATUS FOR THE EXTRACTION OF OBJECTS IMMOBILIZED IN A PNEUMATIC TRANSFER NETWORK

[75] Inventors: Michel Herbreteau, Cherbourg; Robert Marchand, Equeurdreville, both of France

[73] Assignee: Compagnie Generale Des Matieres Nucleaires, Velizy-Villacoublay, France

[21] Appl. No.: 521,593

[22] Filed: Aug. 30, 1995

[30] Foreign Application Priority Data

Sep. 12, 1994 [FR] France .................................. 94 10848

[51] Int. Cl.$^6$ .................................................. A47L 5/36
[52] U.S. Cl. .................. 15/315; 15/347; 15/352
[58] Field of Search ............................. 15/347, 315, 352; 406/11

[56] References Cited

U.S. PATENT DOCUMENTS

| | | | |
|---|---|---|---|
| 2,657,416 | 11/1953 | Smith | 15/352 X |
| 2,718,655 | 9/1955 | Cymara | 15/315 X |
| 2,957,723 | 10/1960 | Walls et al. | |
| 3,401,420 | 9/1968 | Lofgren | 15/315 X |
| 3,653,190 | 4/1972 | Lee et al. | 15/352 X |
| 4,739,535 | 4/1988 | Schuld et al. | 15/315 |
| 5,301,388 | 4/1994 | Zeren | 15/347 X |

FOREIGN PATENT DOCUMENTS 2064460   6/1981   United Kingdom .

*Primary Examiner*—Chris K. Moore
*Attorney, Agent, or Firm*—Pearne, Gordon, McCoy & Granger LLP

[57] ABSTRACT

Apparatus for the extraction of objects (32) immobilized in sections (19) of a pneumatic transfer network (30). The apparatus includes a flexible pipe (12), a metal-clad or radiation-impervious container (10) and a blower (5). A flange (16) makes it possible to connect the pipe (12) to the upstream end of the section (19). A suction system then makes it possible to draw the jammed jug (32) to the bottom of the metal-clad container (8) by moving it back into the section (19). Advantageously, the blower (5) is reversible for propelling the jug (32) in the opposite direction to a scrapping installation, to which is connected the flexible pipe (12). Therefore, both the manipulations and the contamination risks are reduced.

6 Claims, 4 Drawing Sheets

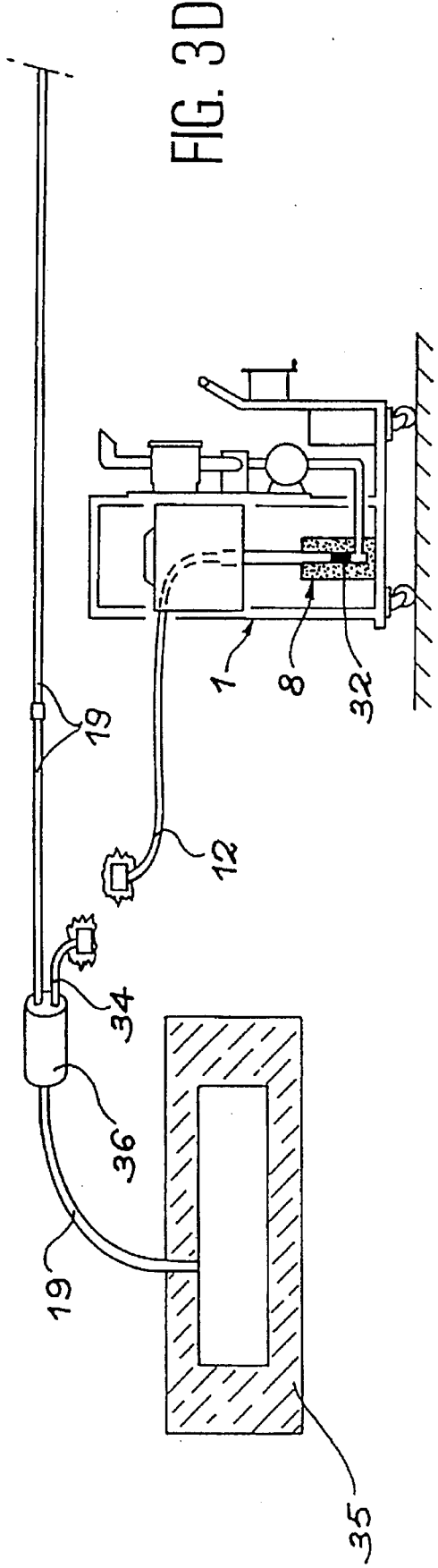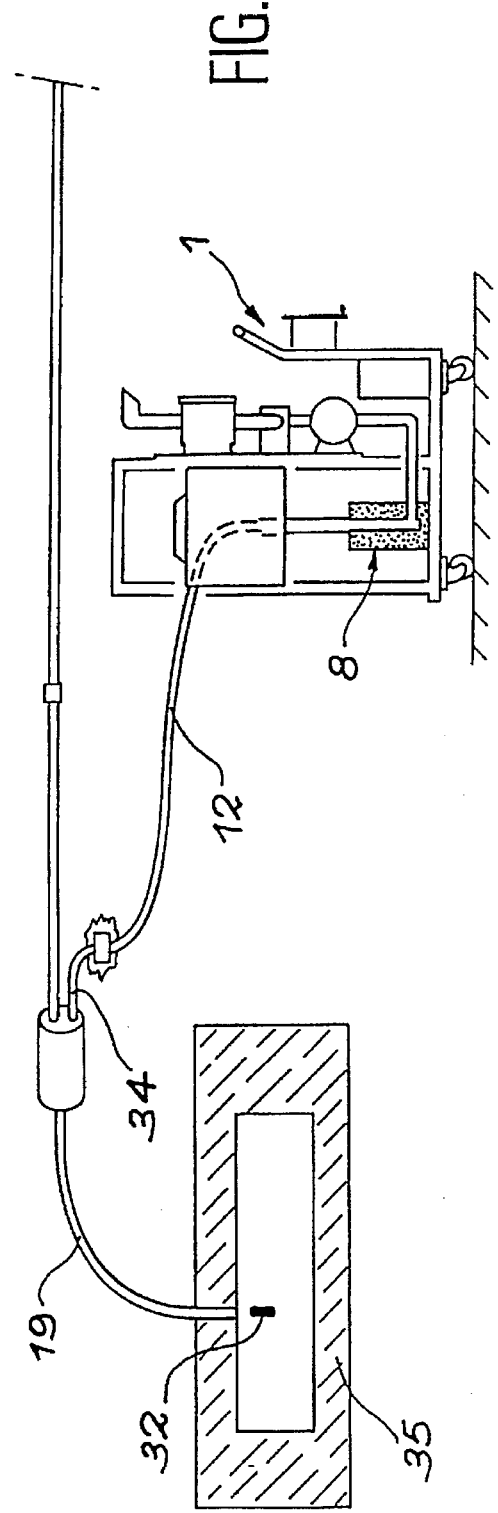

APPARATUS FOR THE EXTRACTION OF OBJECTS IMMOBILIZED IN A PNEUMATIC TRANSFER NETWORK

BACKGROUND OF THE INVENTION

The invention relates to an apparatus for the extraction of objects immobilized in a pneumatic transfer network.

A specifically envisaged application is that of networks or systems connecting individual stations of a radioactive liquid sample analysis installation, said samples being transported in sealed containers. Thus, it can occur that said containers become jammed in the pipes. Hitherto such incidents have been corrected by dismantling the pipe section at the location of the jam from the remainder of the network. However, such an operation takes a long time due to the precautions necessary as a result of the radiation from the container. Further, it is not entirely possible to avoid operating personnel from being irradiated. In certain cases the pipe must be sacrificed and replaced by another pipe. The waste volume is then large, particularly if there are sealing means at the ends of the pipe which must be sacrificed, particularly as ordinary lead-sealed drums are unsuitable due to the excessive dimensions of the pipes and consequently use must be made of other means.

BRIEF SUMMARY OF THE INVENTION

There is consequently a need for the easy, rapid extraction of jammed objects and this need is satisfied by the present invention. In its preferred form, the invention relates to an apparatus comprising by a flexible pipe having a coupling to be joined to the couplings of sections at one end, a metal-clad container at the opposite end of the pipe, as well as a suction system connected to the pipe through the metal-clad container.

In a preferred embodiment of the invention, the suction means is reversible and can serve as a discharger, in order to return the sucked in object into another tube of the network, normally a discharge pipe. This is a very original feature of the invention.

BRIEF DESCRIPTION OF THE SEVERAL VIEWS OF THE DRAWING

An embodiment of the invention is described in greater detail hereinafter relative to the drawings, wherein:

FIGS. 3A to 3E show the different stages of the process.

DETAILED DESCRIPTION OF THE INVENTION

Figure 1:
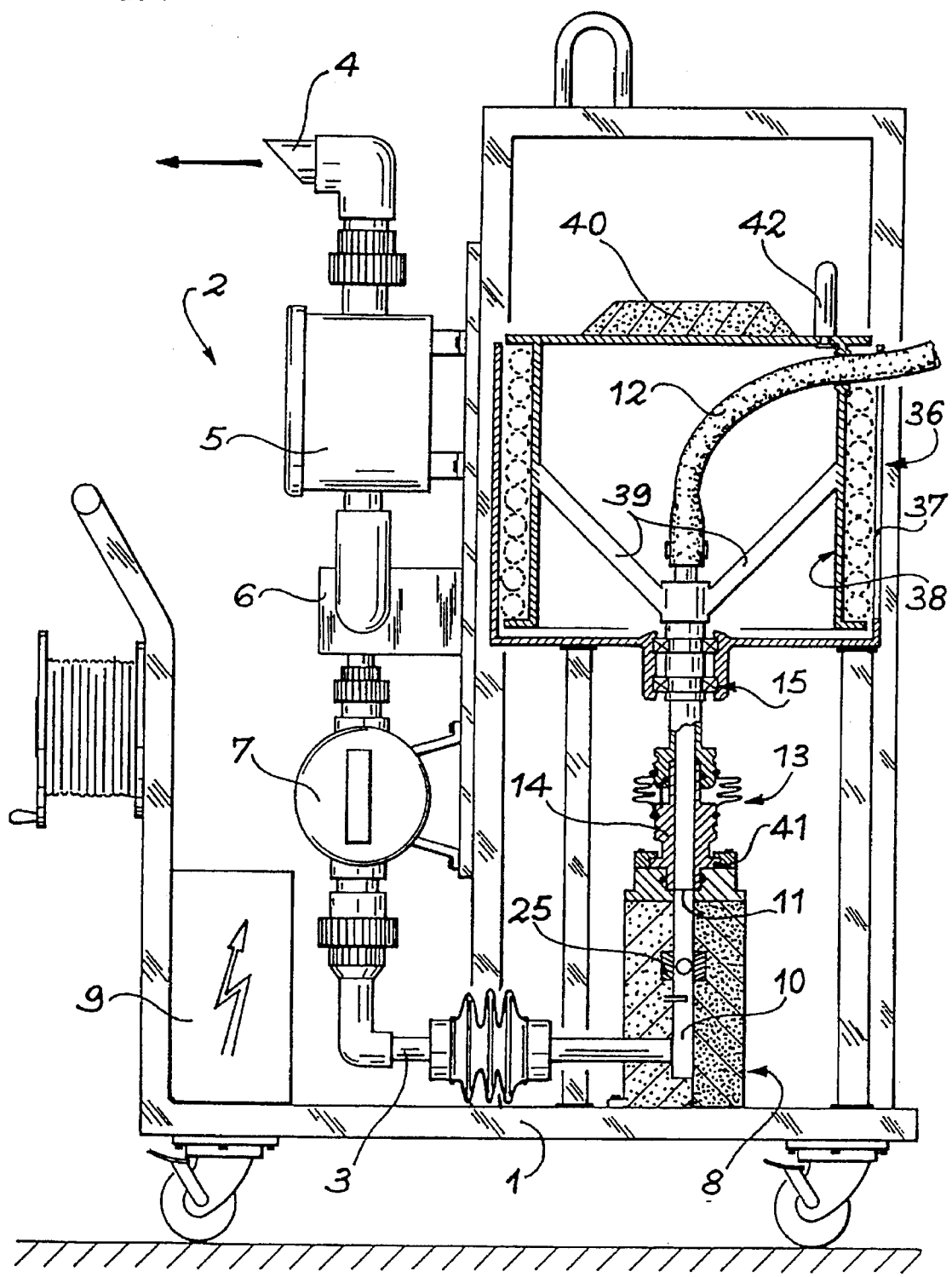
FIG. 1 shows a general view of the apparatus, apart from the fitting for the connection to the sections.

The apparatus is placed on a mobile trolley 1. It is includes a suction system 2, whose components follow one another along a suction pipe 3. These components essentially consist of a suction fitting 4, a blower 5, a solenoid valve 6, a filter 7 and the suction pipe 3 is then connected to the base of a metal-clad or radiation impervious container 8. An electrical cabinet 9 is positioned alongside the suction system 2 and supplies electric power particularly to the blower 5.

The suction pipe 3 leads to the bottom of a cavity 10 formed in the metal-clad container 8 and which has an upper opening 11 connected to a flexible pipe end 12 by a connecting pipe 13, which can incorporate a flange 14 for connection to the metal-clad container 8 and a rotary joint 15 to enable an external drum 36 to rotate. This external drum 36 surrounds the end of the flexible pipe 12 and has a vertical slot 37 for allowing the passage thereof. It also surrounds an internal drum 38 concentric thereto and fitted to the connecting pipe 13 by stays 39. On rotating the external drum 36 relative to the internal drum 38 by gripping the not shown handles on its periphery or beneath its bottom, the flexible pipe 12 is wound in coils located in an annular space between the two drums 36,38. A metal cladding or radiation shield 40 surmounts the cover of the internal drum 38 and stops radiation emitted from the cavity 10 through the opening 11 and in the axis of the connecting pipe 13. The internal drum 38 rotates, because the connecting pipe 13 joined thereto is placed on the shielded container 8 by interposing a rotary bearing 41. Its cover also carries a handle 42. On rotating the two drums 36,38 by the same angle, the flexible pipe 12 which traverses an opening in the wall of the internal drum 38 is oriented in another direction without any displacement of the trolley 1. The flexible pipe 12 is terminated (FIGS. 2 and 2A) by a fitting more particularly comprising a connecting flange 16, which can be threaded round a fitting 17 of a complementary flange 18 of a pneumatic transfer network section 19. The connecting flange 16 has two grooves 20, which receive the thickened, elastic ends 21 of a bellows expansion joint 22. When the connection of the flanges has taken place, one of the ends of the bellows expansion joint 22 is removed from the flange 16 and installed in a similar groove 20 of the complementary flange 18. The seal between the flanges 16 and 18 is consequently guaranteed by the bellows expansion joint 22. However, when the apparatus is inoperative and the connecting flange 16 is detached (FIG. 2A), a cap 23 covers the connecting flange 16 and therefore closes the flexible pipe 12. It can be retained by bayonet notches engaged on studs 24 of the connecting flange 16. The cavity 10 carries a sensor 25 for sensing the presence of an object in the cavity 10.

Figure 2:
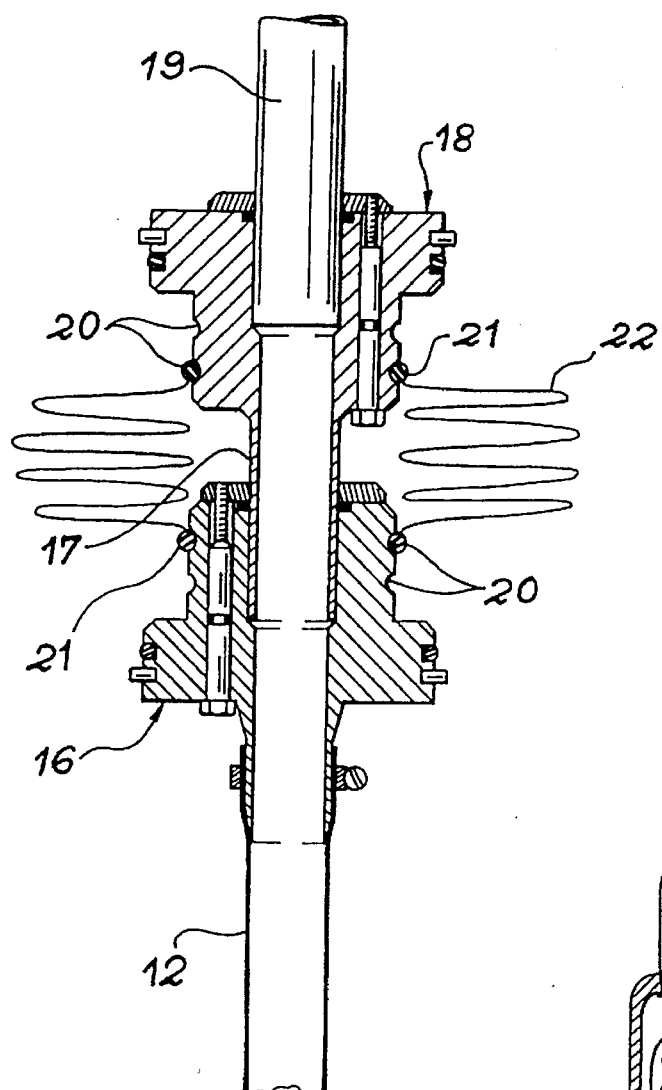
FIGS. 2 and 2A show the fitting of the apparatus in two different states.
Figure 2A:
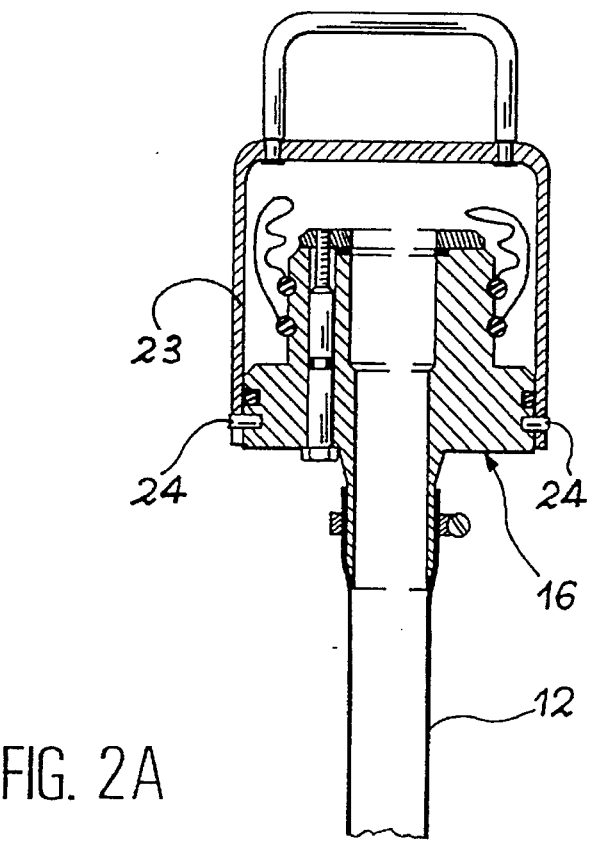

As can be seen in FIGS. 3A to 3E, the apparatus is utilized with a pneumatic transfer network 30 formed from sections 19 joined end to end by couplings 31 constituted by a complementary flange 18 of the type shown in FIG. 2 at the upstream end of each of the sections 19 and a not shown flange, which is identical to the connecting flange 16 shown in FIG. 2 at the downstream end of each of the sections 19. One of the sections 19 is occupied by a transfer receptacle 32 which is jammed therein.

Figure 3A:
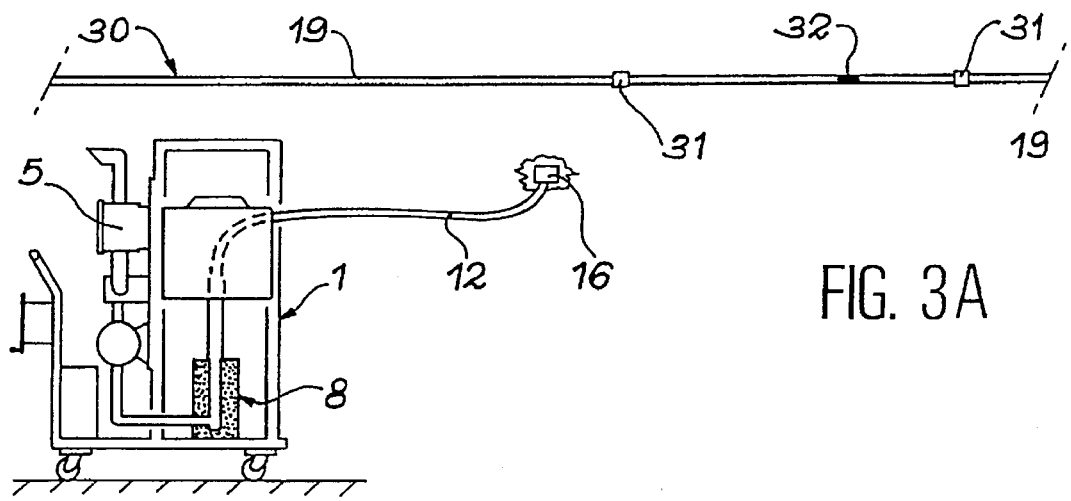
Figure 3B:
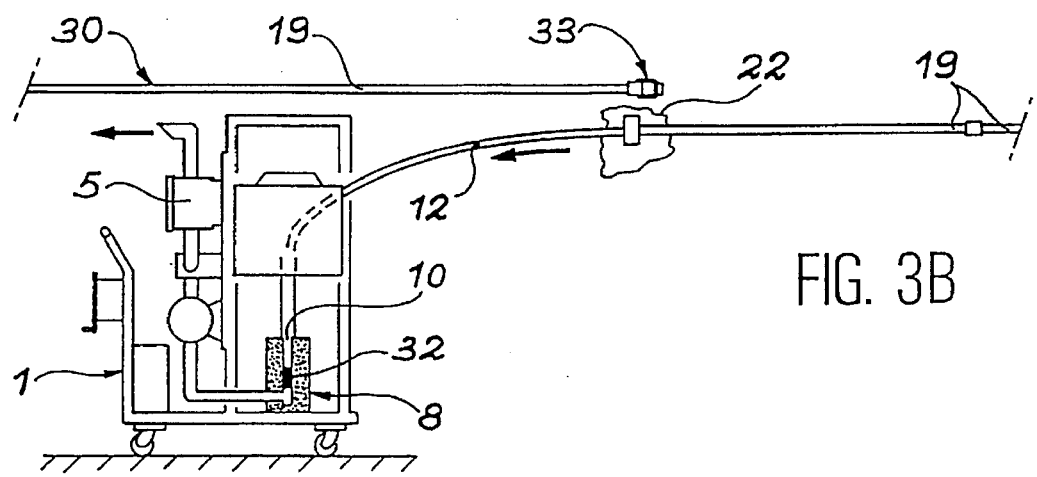
Figure 3C:
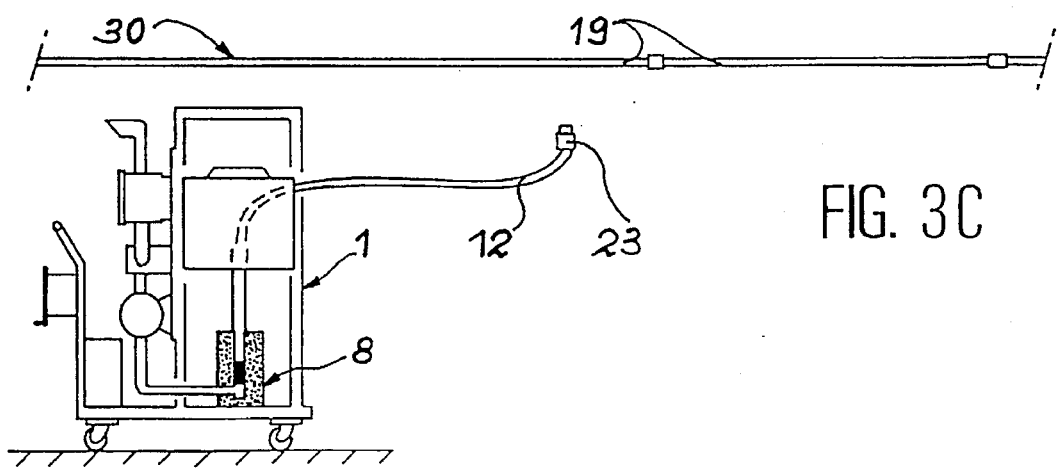

FIG. 3B shows the state of the installation in a following stage. At the location of the jam, the section 19 has been dismantled from the immediately upstream section 19 and has been connected to the flexible pipe 12 in the manner illustrated in FIG. 2. The bellows expansion joint 22 has been put into place and a protective bag 33 has optionally been installed at the free end of the upstream section 19. Then an action of the blower 5 has made it possible to suck in the receptacle 32, which is normally possible because the receptacle is made to perform move on a similar path to that which it has already made, but in the opposite direction. The receptacle 32 arrives at the bottom of the cavity 10 of the metal-clad container 8 and is stopped there. In the manner shown in FIG. 3C, it is then possible to reestablish the continuity of the pneumatic transfer network 32 after dismantling the flexible pipe 12 and replacing the cap 23 around the connecting flange 16 in order to reseal the flexible pipe 12. Thus, jointly with the filter 7, it is possible to prevent the spreading to the outside of pollution which could be caused by the receptacle 32. Therefore the radiation emitted by the same are absorbed by the metal-clad container 8.

There is now plenty of time to bring the apparatus (FIG. 3D) to a discharge section 34 connected to a scrapping installation 35 and which can be joined to other pneumatic transfer network sections 19 forming a continuous line by a barrel coupling 36. In the same way as for FIG. 3B, the flexible pipe 12 is connected to the discharge pipe 34 by their flanges and the blower 5 is put into operation in the reverse direction (which can be carried out in problem-free manner by reversing the supply to the terminals of the electric motor driving the same) and the receptacle 32 is discharged and propelled out of the cavity 10 to the flexible pipe 12, the discharge pipe 34 and the scrapping installation 35, as shown in FIG. 3E.

It is clear that the only operations giving rise to a radiation exposure consist of a dismantling of the flanges upstream of the section 19 at the point of the blockage and connection of the flexible pipe 12, after which the receptacle 32 is immersed in the metal-clad container 8 and the operators are protected. As these operations are short, they are scarcely dangerous. It is also pointed out that the flexible pipe 12 not only makes it possible to easily connect the apparatus to the pneumatic transfer network, but to position the trolley 1 and the operators away from dangerous points.

I claim:

1. Apparatus for the extraction of objects (32) immobilized in a pneumatic transfer network (30) formed from sections (19) terminated by interconnected couplings (31), characterized in that said apparatus comprises a flexible pipe (12) carrying a coupling (19) to be joined to one of the couplings of one of the sections at one end of the pipe, a radiation-impervious container (8) at an opposite end of the pipe, a suction means (5) connected to the pipe (12) through the radiation-impervious container and a sensor (24) for sensing the presence of objects (32) in the radiation-impervious container (8).

2. Extraction apparatus according to claim 1, characterized in that the suction means is reversible and can serve as a discharger.

3. Extraction apparatus according to claim 1, characterized in that it incorporates a rotary drum (36) for winding up the flexible tube (12).

4. Extraction apparatus according to claim 3, characterized in that it incorporates a rotary means (38) for orienting the flexible tube (12).

5. Extraction apparatus according to claim 4, characterized in that the rotary means (38) is a drum concentric to the rotary winding drum (36).

6. Extraction apparatus according to claim 1, characterized by a radiation shield (40) in front of an opening (11) of the radiation-impervious container (8).

* * * * *